United States Patent
Kishima et al.

(10) Patent No.: US 10,501,129 B2
(45) Date of Patent: Dec. 10, 2019

(54) VEHICLE REAR STRUCTURE

(71) Applicant: TOYOTA JIDOSHA KABUSHIKI KAISHA, Toyota-shi (JP)

(72) Inventors: Fumihiko Kishima, Konan (JP); Koji Tokuyama, Nishio (JP); Nozomi Saito, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 68 days.

(21) Appl. No.: 15/987,954

(22) Filed: May 24, 2018

(65) Prior Publication Data

US 2018/0339735 A1 Nov. 29, 2018

(30) Foreign Application Priority Data

May 26, 2017 (JP) .................. 2017-104842

(51) Int. Cl.
 *B62D 37/02* (2006.01)
 *B62D 35/02* (2006.01)
 *B62D 25/18* (2006.01)

(52) U.S. Cl.
 CPC ............. *B62D 35/02* (2013.01); *B62D 25/18* (2013.01)

(58) Field of Classification Search
 CPC .............................. B62D 35/02; B62D 25/18
 See application file for complete search history.

(56) References Cited

U.S. PATENT DOCUMENTS

2014/0302362 A1* 10/2014 Takizawa ............ H01M 10/625
  429/83
2016/0039479 A1 2/2016 Kishima et al.

FOREIGN PATENT DOCUMENTS

| JP | 7-25369 | 1/1995 |
| JP | 2013-71462 | 4/2013 |
| JP | 2014-208514 | 11/2014 |

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle rear structure includes a bottom cover disposed rearward of a rear wheel well in a vehicle front-rear direction. The bottom cover includes an air inlet into which air that has flowed from a front side toward a rear side in the vehicle front-rear direction is taken such that the air flows outward in a vehicle-width direction. The bottom cover further includes an air outlet provided at a position outward of the air inlet in the vehicle-width direction. The air outlet is an air outlet from which the air flows from the air inlet outward in the vehicle-width direction is discharged outward in the vehicle-width direction and downward in a vehicle-height direction.

6 Claims, 13 Drawing Sheets

RELATED ART

VEHICLE REAR STRUCTURE

INCORPORATION BY REFERENCE

The disclosure of Japanese Patent Application No. 2017-104842 filed on May 26, 2017 including the specification, drawings and abstract is incorporated herein by reference in its entirety.

BACKGROUND

1. Technical Field

The disclosure relates to a vehicle rear structure.

2. Description of Related Art

There is a vehicle rear structure configured to take in a turbulent flow, which is generated in a rear wheel well (i.e., a space in a vehicle structure where a rear wheel is accommodated), through an opening provided in a front side of a rear bumper and discharge the turbulent flow through an opening provided in a rear side of the rear bumper, thereby reducing the aerodynamic drag of a vehicle and improving the crosswind stability of the vehicle (see, for example, Japanese Unexamined Patent Application Publication No. 7-25369).

SUMMARY

Usually, a turbulent flow generated in a rear wheel well flows outward in the vehicle-width direction from an upper rear region of the rear wheel well, and air flows into a lower rear region of the rear wheel well from the outside toward the inside in the vehicle-width direction. If not efficiently discharged to the outside of a vehicle, the air flowing into the rear wheel well from the outside toward the inside in the vehicle-width direction may be turned into a turbulent flow. The turbulent flow may contribute to an increase in the aerodynamic drag of the vehicle in motion.

As described earlier, an opening may be provided in a front side of a rear bumper and an opening may be provided in a rear side thereof, so that a turbulent flow, which is generated in an upper region of a rear wheel well, is allowed to flow to a rear side of a vehicle. In this case, however, the pressure inside the rear wheel well is reduced, which may cause an increase in the amount of air flowing into a lower region of the rear wheel well from the outside toward the inside in the vehicle-width direction. That is, a turbulent flow is easily generated in the lower region of the rear wheel well. As a result, the aerodynamic drag of the vehicle in motion may increase.

The disclosure provides a vehicle rear structure configured to regulate the air flowing inside a rear wheel well, thereby reducing the aerodynamic drag of a vehicle in motion.

A first aspect of the disclosure relates to a vehicle rear structure. The vehicle rear structure includes a bottom cover disposed rearward of a rear wheel well in a vehicle front-rear direction. The bottom cover includes an air inlet into which air that has flowed from a front side toward a rear side in the vehicle front-rear direction is taken such that the air flows outward in a vehicle-width direction. The bottom cover includes an air outlet provided at a position outward of the air inlet in the vehicle-width direction. The air outlet is an air outlet from which the air flowing from the air inlet outward in the vehicle-width direction is discharged outward in the vehicle-width direction and downward in a vehicle-height direction.

With this configuration, it is possible to regulate the air flowing inside the rear wheel well, thereby reducing the aerodynamic drag of a vehicle in motion.

The vehicle rear structure described above may further include a discharge-side guide wall provided at a side edge of the air outlet. The discharge-side guide wall may be configured to guide the air such that the air moves outward in the vehicle-width direction and downward in the vehicle-height direction.

With this configuration, the air taken into the air inlet while the vehicle is traveling is effectively guided so as to flow outward in the vehicle-width direction and downward in the vehicle-height direction, and is then discharged from the air outlet.

The discharge-side guide wall may include an outer slant wall extending from an outer-side edge of the air outlet inward in the vehicle-width direction and upward in the vehicle-height direction. The outer-side edge is on an outer side of the air outlet in the vehicle-width direction. The outer-side edge may extend in the vehicle front-rear direction.

With this configuration, the air taken into the air inlet while the vehicle is traveling is entirely guided so as to flow outward in the vehicle-width direction and downward in the vehicle-height direction, and then discharged from the air outlet.

In the vehicle rear structure described above, the discharge-side guide wall may include a rear slant wall extending from a rear-side edge of the air outlet forward in the vehicle front-rear direction and upward in the vehicle-height direction. The rear-side edge may be on a rear side of the air outlet in the vehicle front-rear direction. The rear-side edge may extend in the vehicle-width direction.

With this configuration, the air taken into the air inlet and flowing rearward in the vehicle front-rear direction while the vehicle is traveling is entirely guided so as to flow outward in the vehicle-width direction and downward in the vehicle-height direction, and then discharged from the air outlet.

The vehicle rear structure described above may further include an intake-side guide wall provided at a side edge of the air inlet. The intake-side guide wall may be configured to guide the air such that the air flows outward in the vehicle-width direction.

With this configuration, the air taken into the air inlet while the vehicle is traveling is effectively guided so as to flow outward in the vehicle-width direction.

In the vehicle rear structure described above, the bottom cover may be provided with a duct configured such that air taken into the air inlet is discharged from the air outlet.

With this configuration, the air taken into the air inlet while the vehicle is traveling is entirely discharged from the air outlet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, example embodiments of the disclosure will be described in detail with reference to the accompanying drawings. For convenience of description, the directions indicated as necessary by the arrows UP, FR, LH in the drawings will respectively denote the vehicle upward direction, the vehicle forward direction, and the vehicle leftward direction. Unless otherwise specified, the upper and lower sides (upward and downward), the front and rear sides (forward and rearward), and the right and left sides (rightward and leftward) in the following description will respectively refer to the upper and lower sides (upward and downward) in the vehicle-height direction, the front and rear sides (forward and rearward) in the vehicle front-rear direction, and the right and left sides (rightward and leftward) in the vehicle lateral direction (i.e., the vehicle-width direction).

Figure 1:
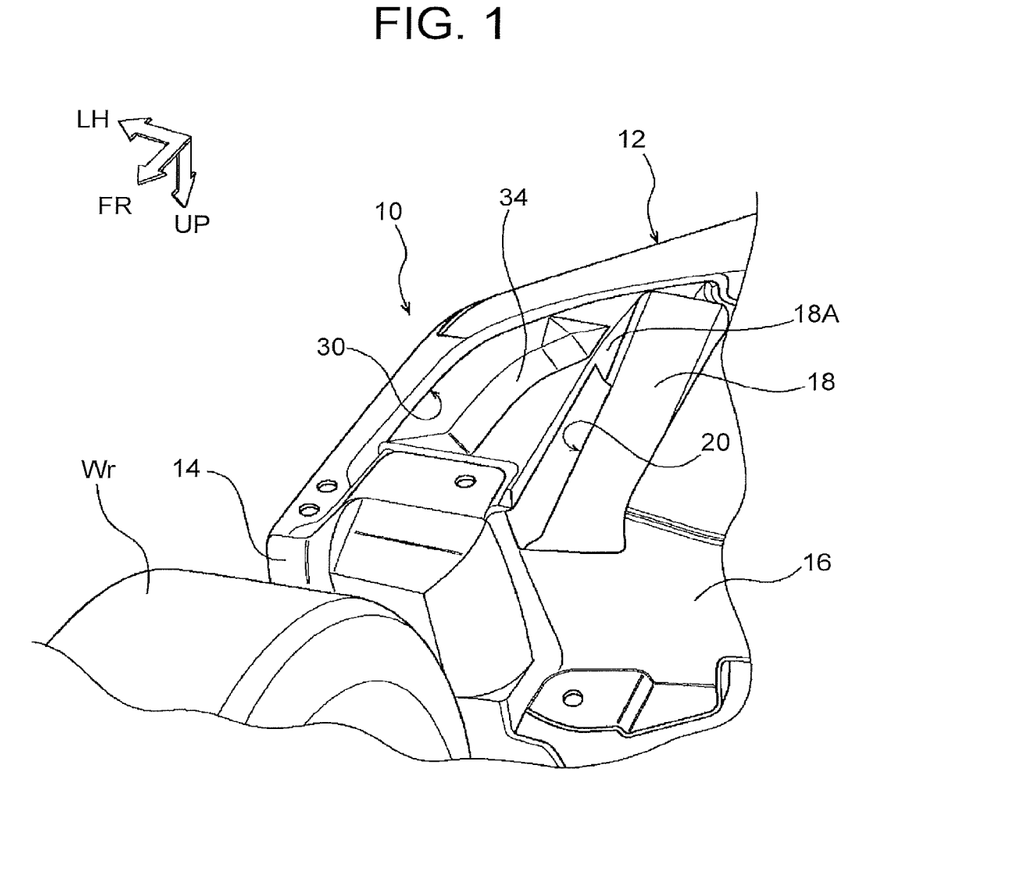
FIG. 1 is a perspective view illustrating a vehicle rear structure according to an embodiment, as viewed from below.

As illustrated in FIG. 1, a bottom cover 16 made of resin is disposed at the bottom of a vehicle 12. The bottom cover 16 is disposed at least at a position rearward of a rear wheel well 14 in the vehicle front-rear direction. The rear wheel well 14 is a space in a vehicle structure where a rear wheel Wr is accommodated. The bottom cover 16 included in a vehicle rear structure 10 according to the present embodiment has an air inlet 20 and an air outlet 30.

Figure 2:
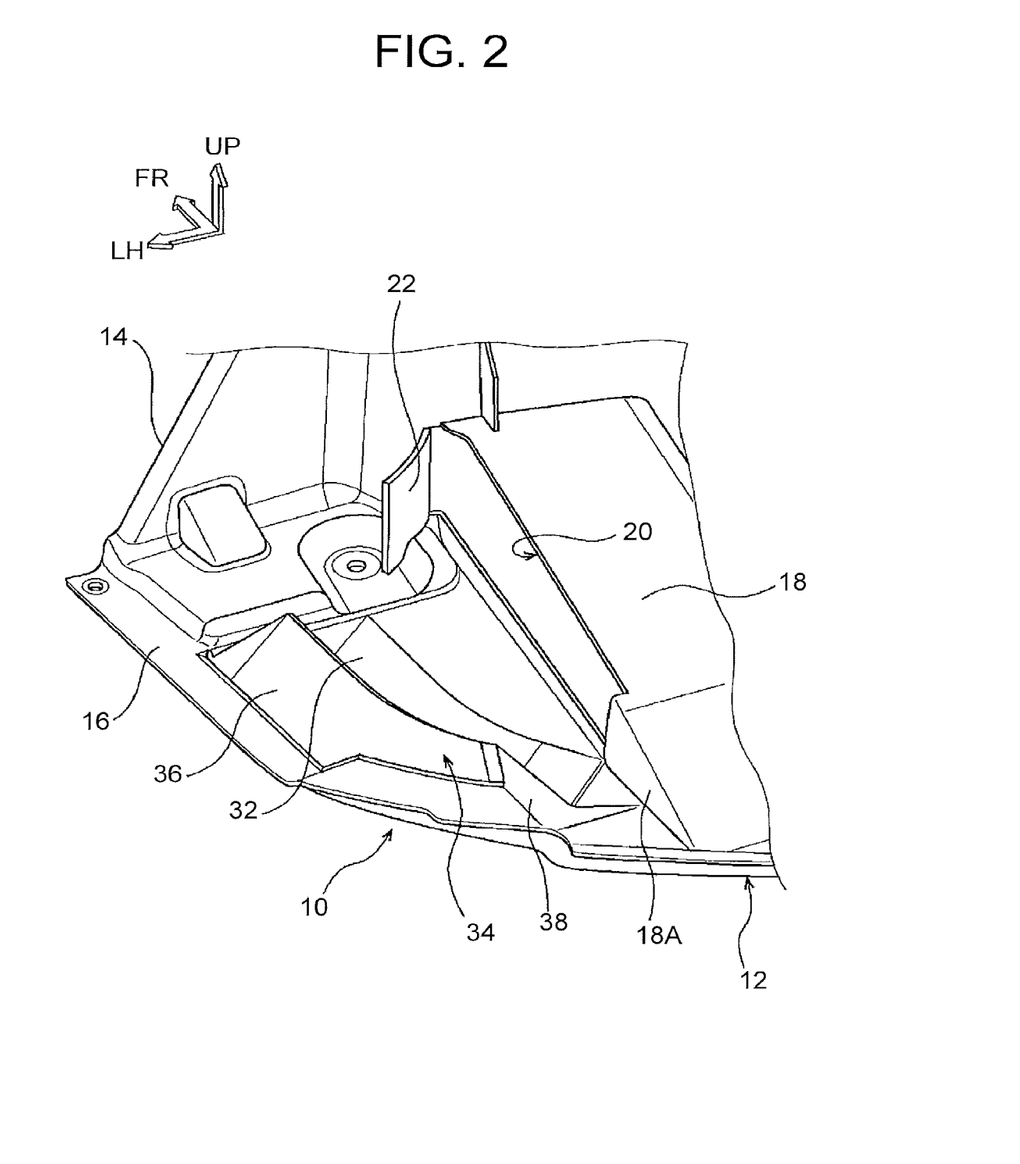
FIG. 2 is a perspective view illustrating an air inlet of the vehicle rear structure according to the embodiment.

As illustrated in FIG. 1 and FIG. 2, the bottom cover 16 is provided with a slant gutter 18 extending in the vehicle front-rear direction. The slant gutter 18 is slanted downward in the vehicle-height direction such that the depth of the slant gutter 18 is reduced in a direction toward the rear of the vehicle 12. As viewed in the vehicle front-rear direction, the slant gutter 18 has a generally U-shaped cross-section that opens downward in the vehicle-height direction. The air inlet 20 extends over almost the entire region of a wall 18A of the slant gutter 18. The wall 18A faces outward in the vehicle-width direction.

Figure 4:
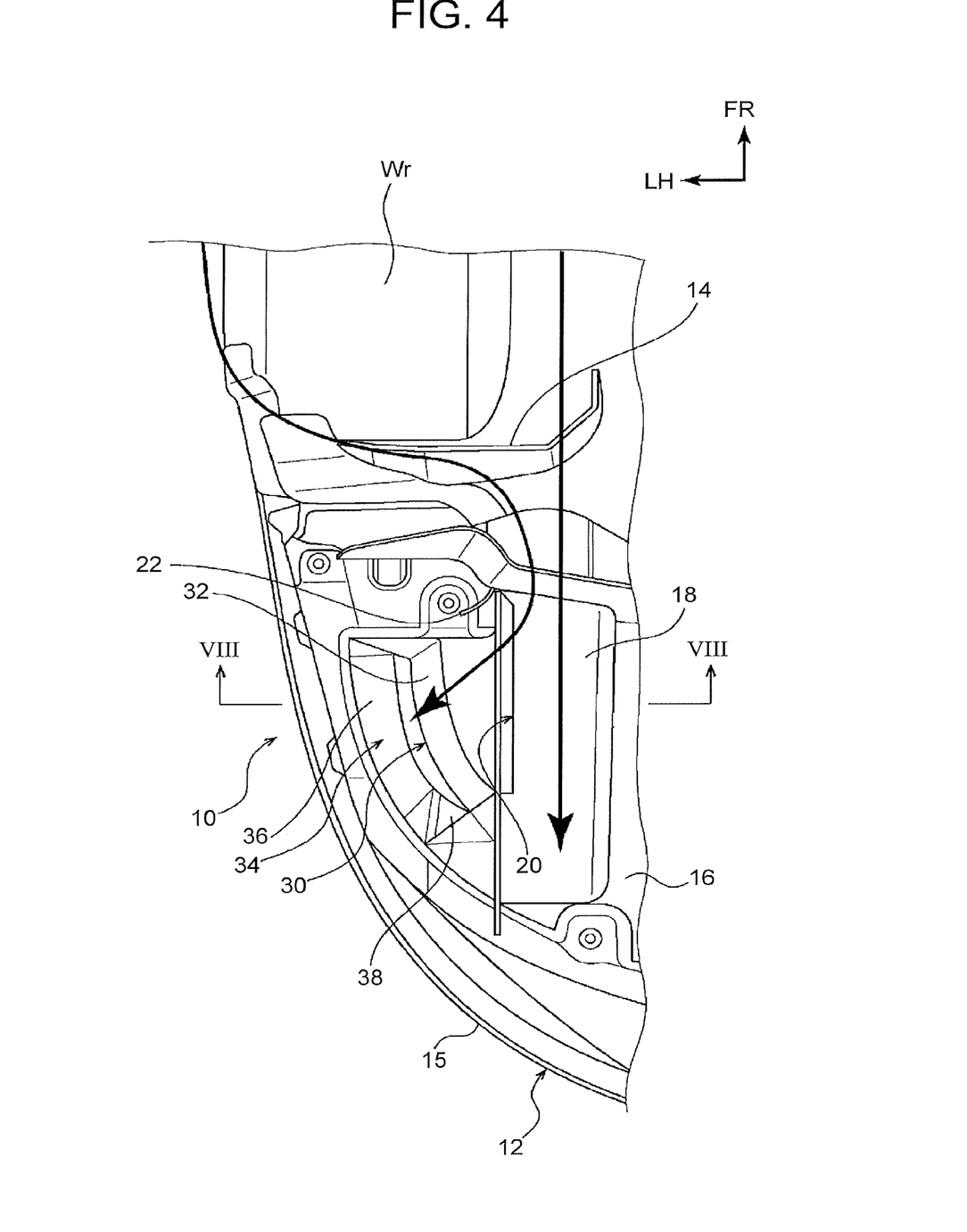
FIG. 4 is a plan view illustrating the vehicle rear structure according to the embodiment.
Figure 6:
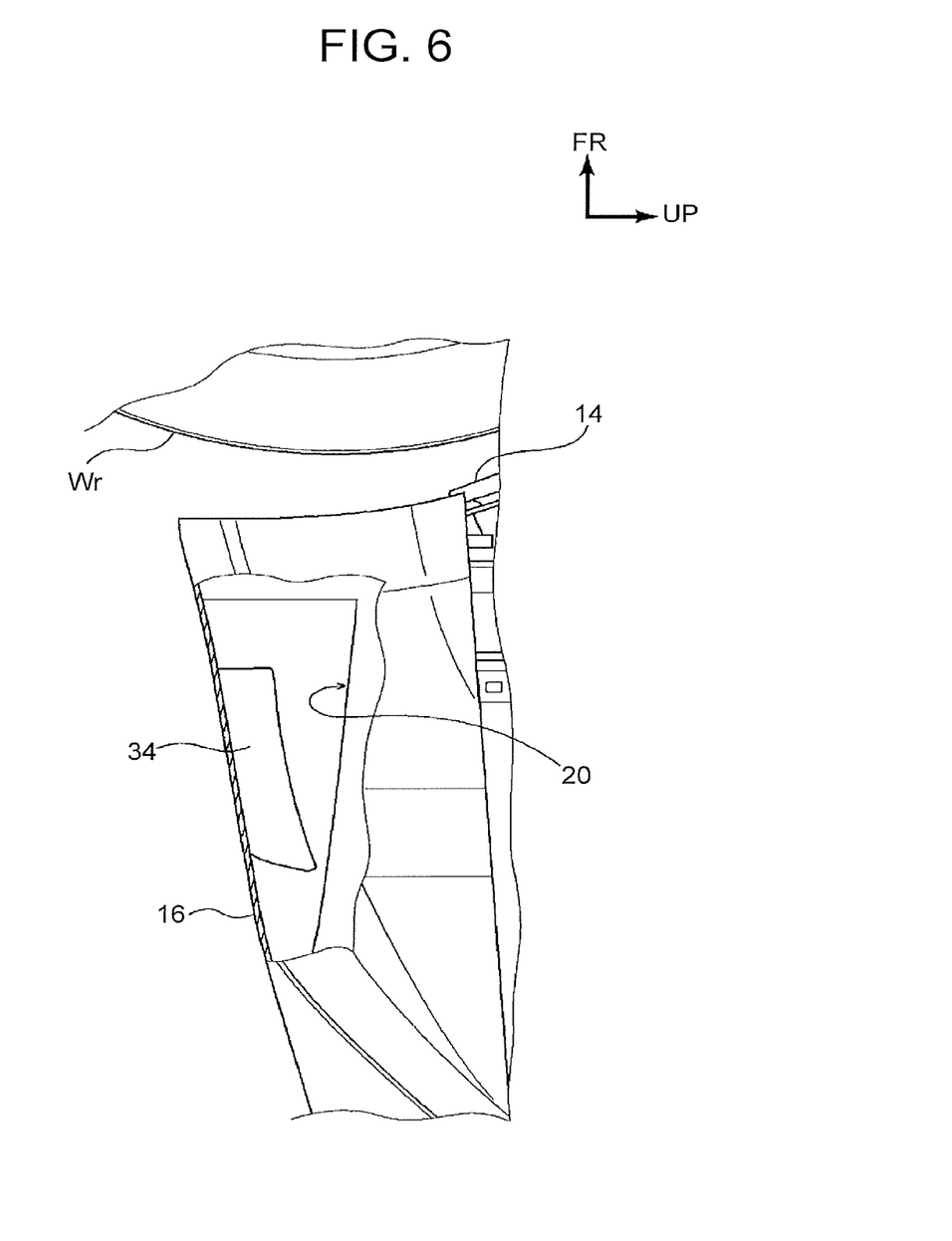
FIG. 6 is a partially-cutaway side view illustrating the vehicle rear structure according to the embodiment.

Specifically, in a side view of the air inlet 20 as viewed in the vehicle-width direction, the air inlet 20 has a generally rectangular shape elongated in the vehicle front-rear direction as illustrated in FIG. 6. The depth of the opening constituting the air inlet 20 is reduced toward the rear of the vehicle 12. The air inlet 20 opens outward in the vehicle-width direction. Thus, as illustrated in FIG. 4, the air flowing through the slant gutter 18 while the vehicle 12 is traveling is at least partially taken into the air inlet 20 and flows outward in the vehicle-width direction.

As illustrated in FIG. 3 to FIG. 5 and FIG. 7, the air outlet 30 is provided in the bottom cover 16, at a position outward of the air inlet 20 in the vehicle-width direction, and the air outlet 30 has a generally rectangular shape elongated in the vehicle front-rear direction. More specifically, as illustrated in each of a plan view in FIG. 4 and a bottom view in FIG. 5, the air outlet 30 has a generally rectangular shape, and a rear end portion of the air outlet 30 in the vehicle front-rear direction is curved inward in the vehicle-width direction such that the shape of the rear end portion of the air outlet 30 roughly conforms to the shape of a portion of the vehicle 12 (a rear bumper 15 illustrated in FIG. 7), which is on the outer side of the vehicle 12 in the vehicle-width direction and on the rear side of the vehicle 12.

Figure 3:
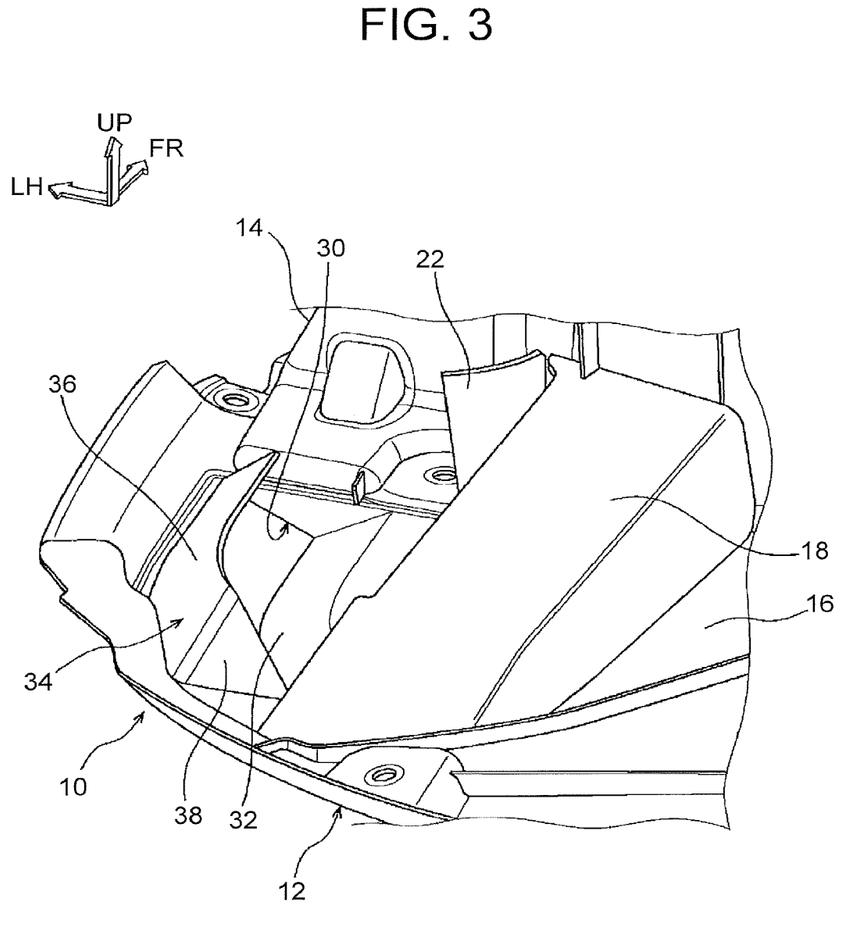
FIG. 3 is a perspective view illustrating an air outlet of the vehicle rear structure according to the embodiment.
Figure 7:
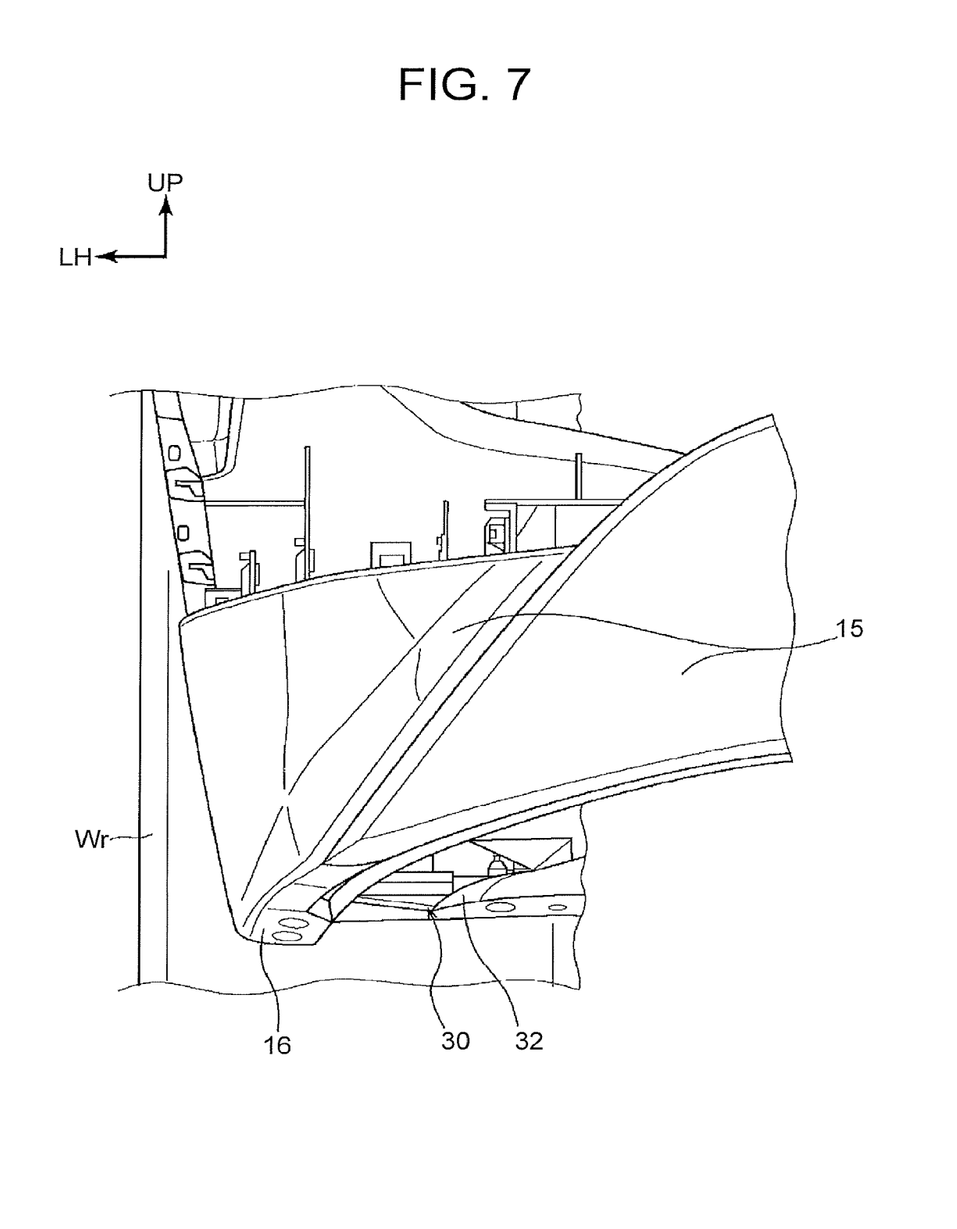
FIG. 7 is a rear view illustrating the vehicle rear structure according to the embodiment.

As illustrated in FIG. 3 and FIG. 7, an edge of a lower slant wall 32 coincides with an inner-side edge of the air outlet 30. The inner-side edge of the air outlet 30 is on the inner side of the air outlet 30 in the vehicle-width direction, and extends in the vehicle front-rear direction. The lower slant wall 32 is slanted downward in the vehicle-height direction and outward in the vehicle-width direction (hereinafter, "downward in the vehicle-height direction and outward in the vehicle-width direction" will be referred to as "downward and outward in the vehicle-width direction"). The air taken into the air inlet 20 and flowing outward in the vehicle-width direction is guided by the lower slant wall 32 and a slant wall 34 (described later) such that the air flows downward and outward in the vehicle-width direction (see FIG. 8).

As illustrated in FIG. 2 and FIG. 3, an outer slant wall 36 is provided so as to be integral with an outer-side edge of the air outlet 30 and so as to stand therefrom. The outer-side edge of the air outlet 30 is on the outer side of the air outlet 30 in the vehicle-width direction, and extends in the vehicle front-rear direction. The outer slant wall 36 is slanted inward in the vehicle-width direction and upward in the vehicle-height direction. Further, a rear slant wall 38 is provided so as to be integral with a rear-side edge of the air outlet 30 and so as to stand therefrom. The rear-side edge of the air outlet 30 is on the rear side of the air outlet 30 in the vehicle front-rear direction, and extends in the vehicle-width direction. The rear slant wall 38 is slanted forward in the vehicle front-rear direction and upward in the vehicle-height direction.

A rear end portion of the outer slant wall 36 is integral with an outer end portion of the rear slant wall 38 in the vehicle-width direction, so that the outer slant wall 36 and the rear slant wall 38 constitute the slant wall 34 that is a single-piece wall. The slant wall 34 (i.e., the outer slant wall 36 and the rear slant wall 38) is an example of a discharge-side guide wall in the disclosure.

Figure 5:
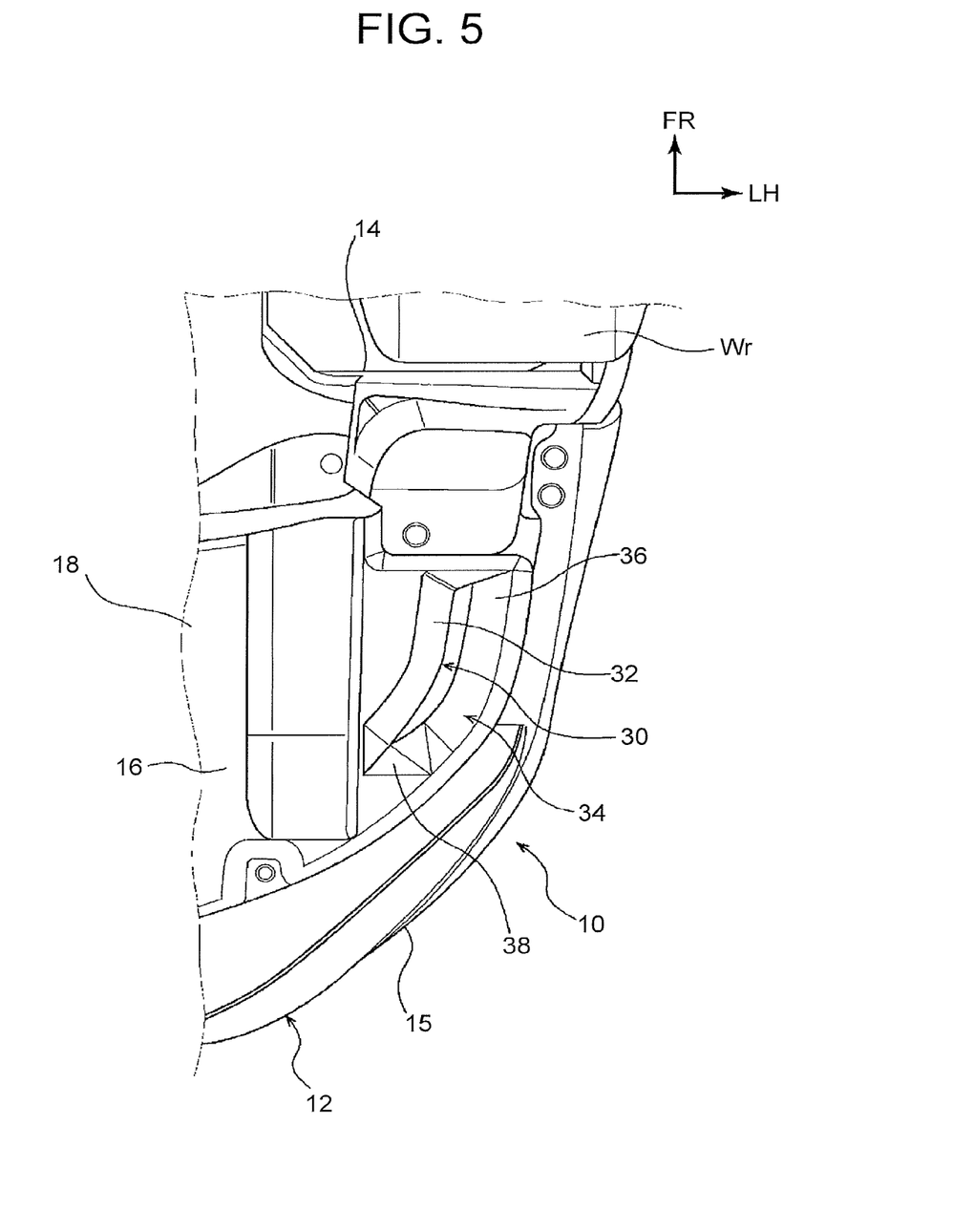
FIG. 5 is a bottom view illustrating the vehicle rear structure according to the embodiment.

As illustrated in FIG. 4 and FIG. 5, the slant wall 34 has substantially the same shape as that of the air outlet 30 in a plan view, so that the slant wall 34 covers a part (or the entirety) of the air outlet 30 in a plan view. The slant wall 34 overhangs the air outlet 30 from the outside in the vehicle-width direction and from the rear side in the vehicle front-rear direction.

Figure 8:
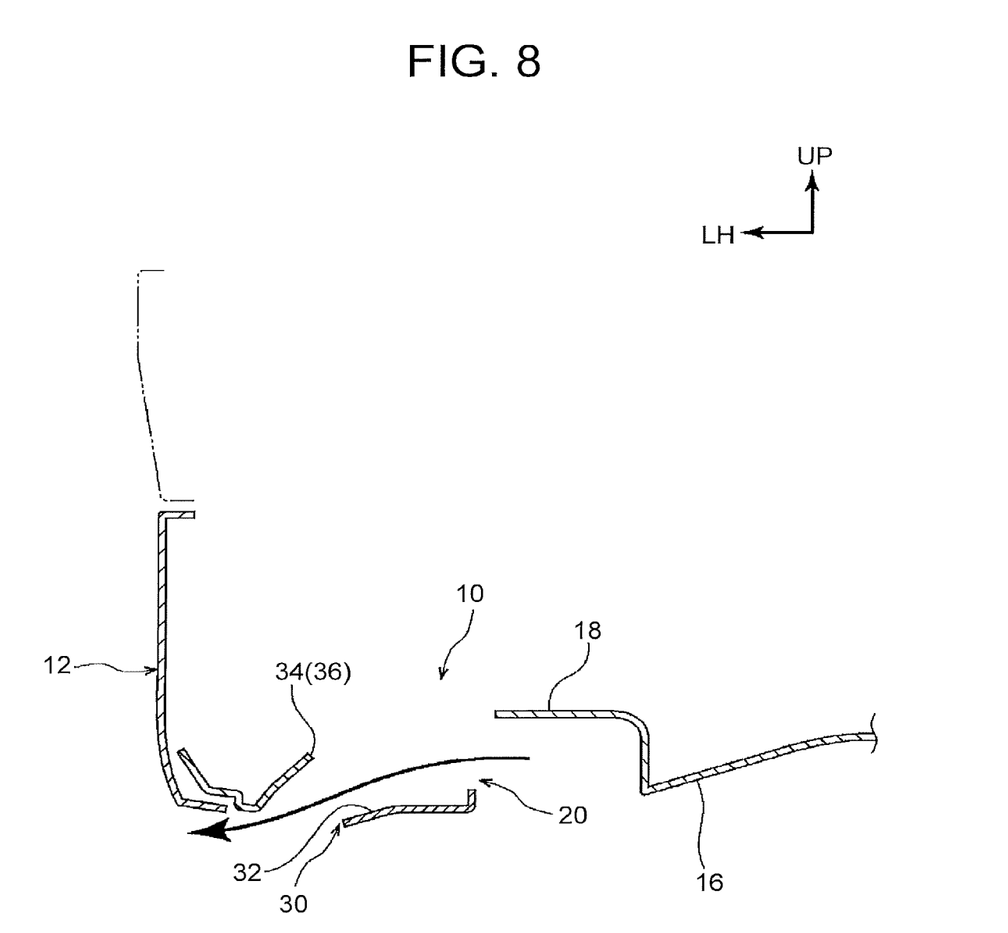
FIG. 8 is a sectional view taken along line VIII-VIII in FIG. 4, illustrating the vehicle rear structure according to the embodiment.

As illustrated in FIG. 8, the level of the slant wall 34 (including the angle of the slant wall 34 relative to the horizontal direction, as viewed in the vehicle front-rear direction) needs to be set such that the air taken into the air inlet 20 and flowing outward in the vehicle-width direction is effectively guided into the air outlet 30.

As illustrated in FIG. 2 to FIG. 4, a front slant wall 22 is provided so as to be integral with a front-side edge of the air inlet 20. The front-side edge of the air inlet 20 is on the front side of the air inlet 20 in the vehicle front-rear direction. The front slant wall 22 extends outward in the vehicle-width direction. The front slant wall 22 is in the form of a curved plate that bulges toward the rear of the vehicle 12 in a plan view. The front slant wall 22 has a rectangular shape as viewed in the vehicle front-rear direction.

The air taken into the air inlet 20 is guided by the front slant wall 22 such that the air flows outward in the vehicle-width direction. The front slant wall 22 is an example of an intake-side guide wall in the disclosure.

Next, the operation of the vehicle rear structure 10 having the foregoing configuration will be described.

Figure 9:
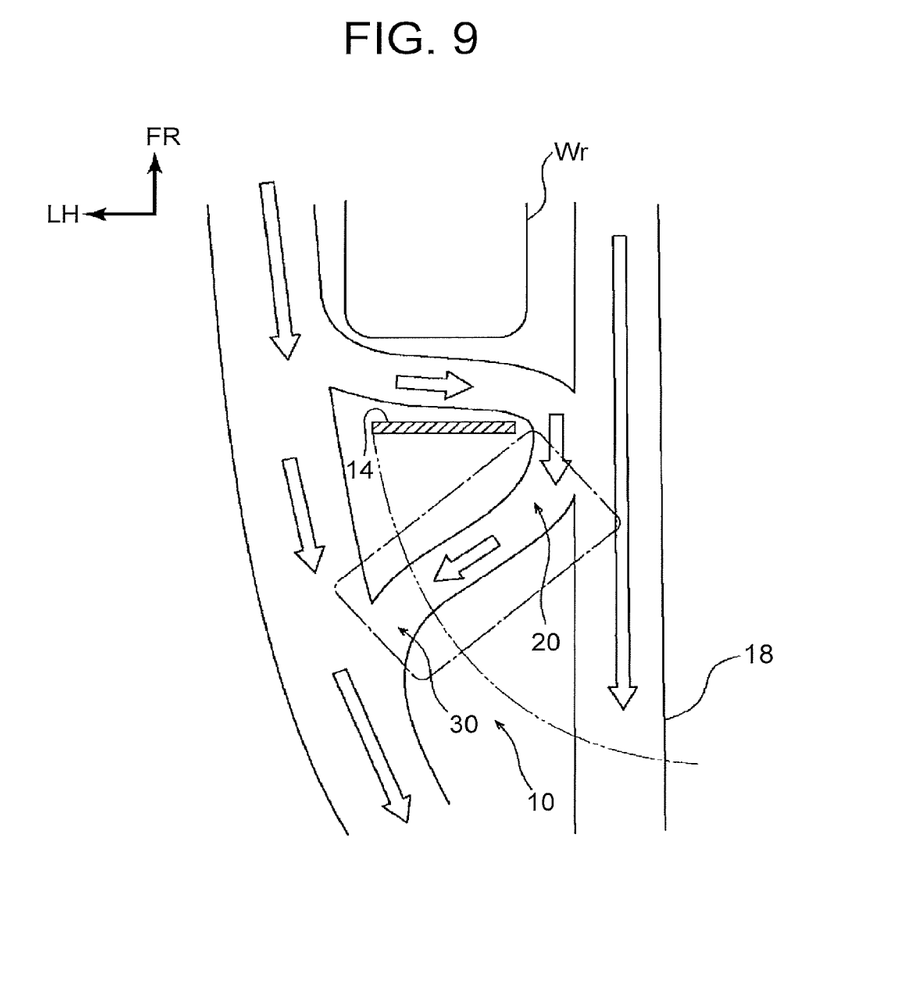
FIG. 9 is a view illustrating flows of air in the vehicle rear structure according to the embodiment.

As illustrated in FIG. 4 and FIG. 9, the air flowing along the bottom of the vehicle 12 from the front side in the vehicle front-rear direction while the vehicle 12 is traveling is partially discharged through the slant gutter 18 toward the rear side of the vehicle 12. Further, the air flows into a lower rear region of the rear wheel well 14 from the outside toward the inside in the vehicle-width direction, and then flows into the slant gutter 18. The lower rear region of the rear wheel well 14 is a region rearward of the rear wheel Wr in the vehicle front-rear direction. Note that the air flows outward in the vehicle-width direction from an upper rear region of the rear wheel well 14.

Figure 13:
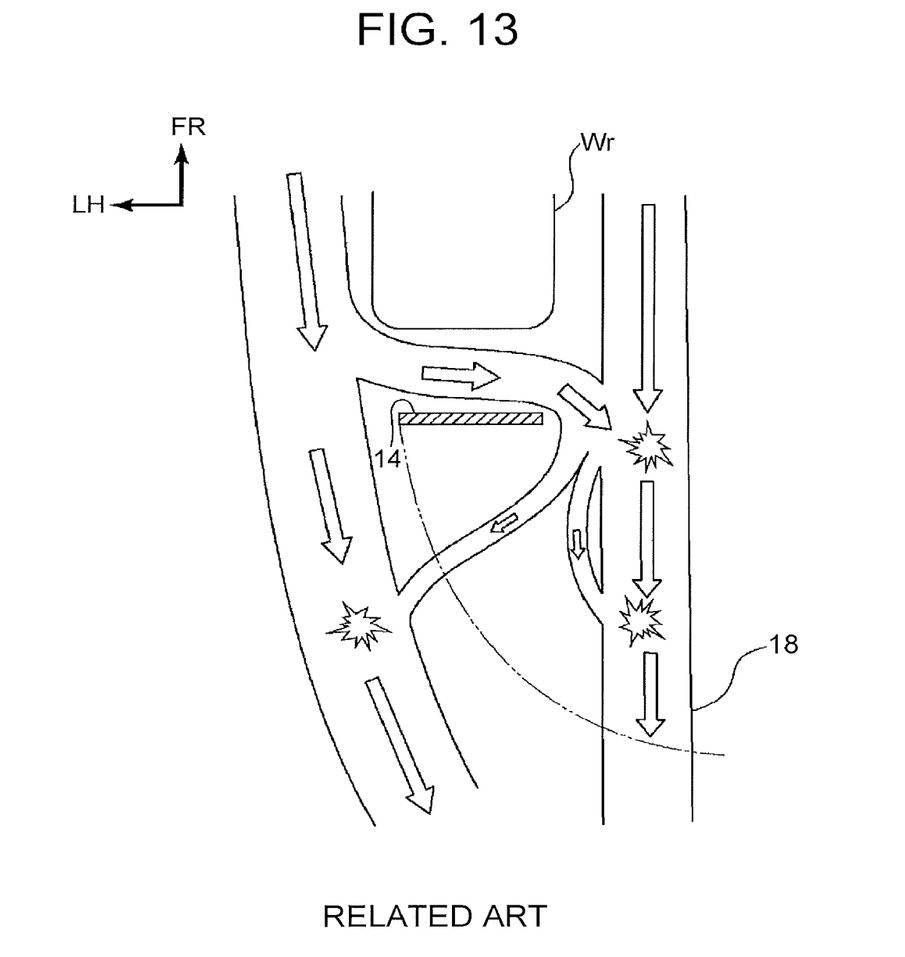
FIG. 13 is a view illustrating flows of air in a vehicle rear structure according to a comparative example.

FIG. 13 illustrates a comparative example in which the air inlet 20 and the air outlet 30 are not provided. In this comparative example, the air flowing into the lower rear region of the rear wheel well 14 from the outside toward the inside in the vehicle-width direction may collide with the air flowing through the slant gutter 18 thereby generating a turbulent flow or may collide with the air flowing along a side surface of the vehicle 12 thereby generating a turbulent flow.

In contrast to this, in the vehicle rear structure 10 according to the present embodiment, the air inlet 20 is provided in the wall 18A of the slant gutter 18, which faces outward in the vehicle-width direction. Thus, the air flowing through the slant gutter 18 is at least partially taken into the air inlet 20 and flows outward in the vehicle-width direction. In particular, the front slant wall 22 is provided at the front-side edge of the air inlet 20 in the vehicle front-rear direction, so that the air taken into the air inlet 20 is effectively guided so as to flow outward in the vehicle-width direction.

Further, the air outlet 30 is provided in the bottom cover 16, at a position outward of the air inlet 20 in the vehicle-width direction. The outer slant wall 36 is provided at the outer-side edge of the air outlet 30 in the vehicle-width direction, and the rear slant wall 38 is provided at the rear-side edge of the air outlet 30 in the vehicle front-rear direction. In other words, the slant wall 34 is provided on the outer side of the air outlet 30 in the vehicle-width direction and on the rear side of the air outlet 30 in the vehicle front-rear direction.

As illustrated in FIG. 8, the air taken into the air inlet 20 and flowing outward in the vehicle-width direction while the vehicle 12 is traveling is effectively guided by the slant wall 34 so as to flow downward and outward in the vehicle-width direction and is then smoothly and efficiently discharged from the air outlet 30 with the inertial force of the airflow maintained.

More specifically, the air taken into the air inlet 20 and flowing outward in the vehicle-width direction is guided by the outer slant wall 36 entirely (without generating a turbulent flow) so as to flow downward and outward in the vehicle-width direction and is then discharged from the air outlet 30. Further, the air taken into the air inlet 20 and flowing rearward in the vehicle front-rear direction (outward in the vehicle-width direction and rearward in the vehicle front-rear direction) is guided by the rear slant wall 38 entirely (without generating a turbulent flow) so as to flow downward and outward in the vehicle-width direction and is then discharged from the air outlet 30.

Thus, the air flowing into the lower rear region of the rear wheel well 14 from the outside toward the inside in the vehicle-width direction while the vehicle 12 is traveling is regulated at the bottom cover 16 disposed rearward of the rear wheel well 14 in the vehicle front-rear direction, such that the air effectively flows from the inside toward the outside in the vehicle-width direction and then merges smoothly with the air flowing along the side surface of the vehicle 12 (see FIG. 9). As a result, the aerodynamic drag of the vehicle 12 in motion can be reduced.

In other words, the air flowing into the lower rear region of the rear wheel well 14 from the outside toward the inside in the vehicle-width direction while the vehicle 12 is traveling can be efficiently discharged to the outside of the vehicle 12 from the bottom cover 16 disposed rearward of the rear wheel well 14 in the vehicle front-rear direction. Thus, it is possible to partially or entirely prevent reduction in the flow velocity of the air. The reduction in the flow velocity of the air occurs when the air flowing into the lower rear region of the rear wheel well 14 from the outside toward the inside in the vehicle-width direction excessively gathers and becomes a turbulent flow.

The air flowing into the lower rear region of the rear wheel well 14 from the outside toward the inside in the vehicle-width direction while the vehicle 12 is traveling is regulated at the bottom cover 16 disposed rearward of the rear wheel well 14 in the vehicle front-rear direction, such that the air flows effectively from the inside toward the outside in the vehicle-width direction. Thus, the flow rate of the air flowing along the bottom cover 16 from the inside toward the outside in the vehicle-width direction also increases. As a result, it is possible to reduce the flow rate of the air flowing outward in the vehicle-width direction from the upper rear region of the rear wheel well 14.

Moreover, the air flowing into the lower rear region of the rear wheel well 14 from the outside toward the inside in the vehicle-width direction while the vehicle 12 is traveling is discharged from the air outlet 30 provided in the bottom cover 16 disposed rearward of the rear wheel Wr in the vehicle front-rear direction. Thus, it is possible to partially or entirely prevent the air from flowing into a region rearward of the rear wheel Wr, thereby partially or entirely preventing reduction in the flow velocity. As a result, it is possible to regulate an airflow generated on the rear side of the vehicle 12 (the outer side of the rear bumper 15) while the vehicle 12 is traveling.

The shape of the air outlet 30 roughly conforms to the shape of a portion of the vehicle 12 (the rear bumper 15), which is on the outer side of the vehicle 12 in the vehicle-width direction and on the rear side of the vehicle 12. Thus, the air can be discharged along a lower end portion of the rear bumper 15, which is on the outer side in the vehicle-width direction. Thus, it is possible to reduce a shearing force acting on an airflow near the outer side of the rear bumper 15 in the vehicle-width direction, thereby reducing generation of a vertical vortex (an airflow swirling in the vehicle-height direction).

As a result, it is possible to increase the flow velocity of the air flowing along an upper surface and a lower surface of the bottom cover 16, thereby further reducing the aerodynamic drag of the vehicle 12 in motion. Thus, the steering stability of the vehicle 12 can be improved.

The air outlet 30 is provided in the bottom cover 16 disposed rearward of the rear wheel Wr in the vehicle front-rear direction. Thus, for example, muddy water or snow having reached the upper surface of the bottom cover 16 can be discharged to a portion that cannot be seen in a side view and a rear view, unlike in a case where the air outlet 30 is provided in the rear bumper 15.

Figure 10:
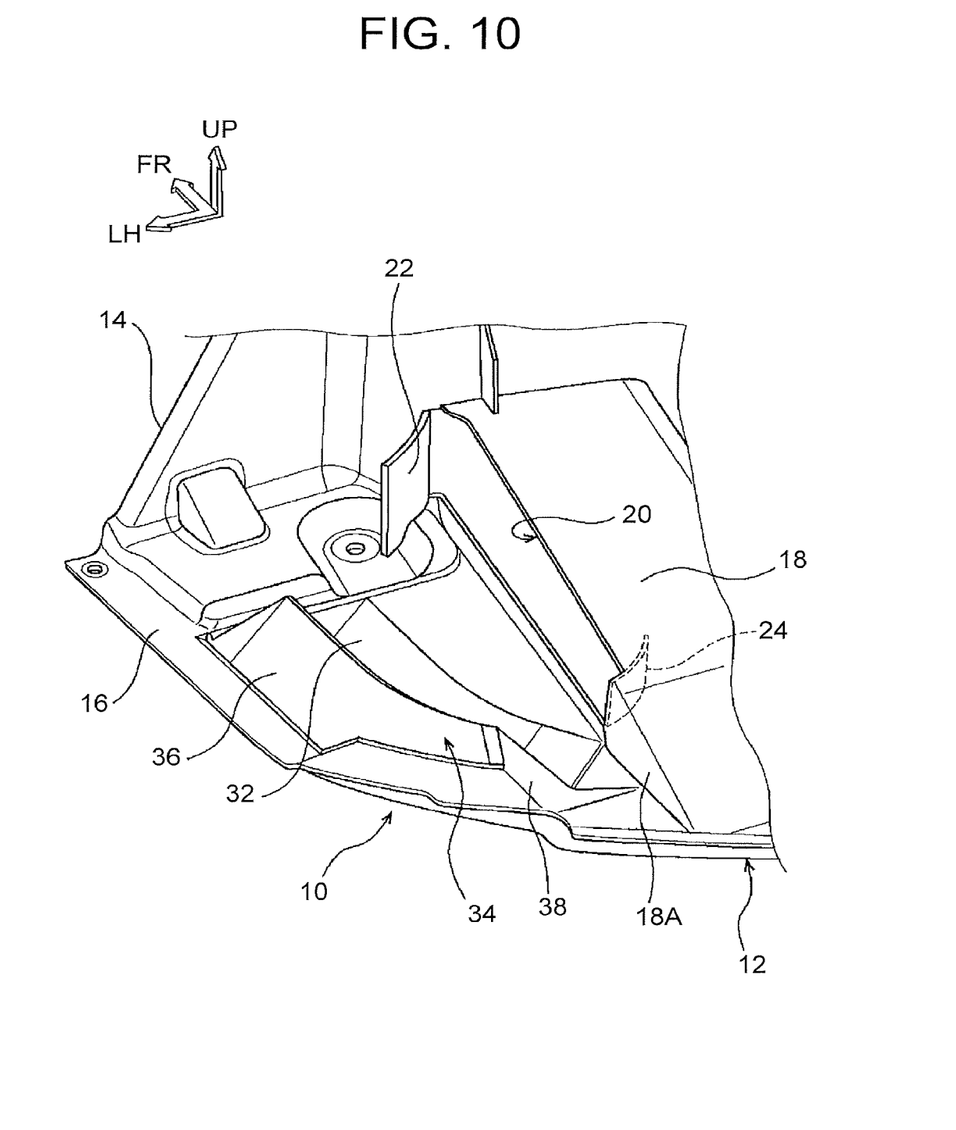
FIG. 10 is a perspective view illustrating a vehicle rear structure according to a modified example of the embodiment.

As illustrated in FIG. 10, a rear slant wall 24 may be provided so as to be integral with a rear-side edge of the air inlet 20. The rear-side edge of the air inlet 20 is on the rear side of the air inlet 20 in the vehicle front-rear direction. The rear slant wall 24 extends inward in the vehicle-width direction. The rear slant wall 24 is in the form of a curved plate that bulges toward the rear of the vehicle 12 in a plan view. The rear slant wall 24 has a rectangular shape as viewed in the vehicle front-rear direction.

Provision of the rear slant wall 24 allows the air flowing through the slant gutter 18 to be more effectively guided so as to flow outward in the vehicle-width direction and then taken into the air inlet 20. The rear slant wall 24 is also an example of the intake-side guide wall in the disclosure. The size of the rear slant wall 24 is preferably as small as possible, so that the entry of, for example, muddy water or snow onto the upper surface of the bottom cover 16 is reduced.

Figure 11:
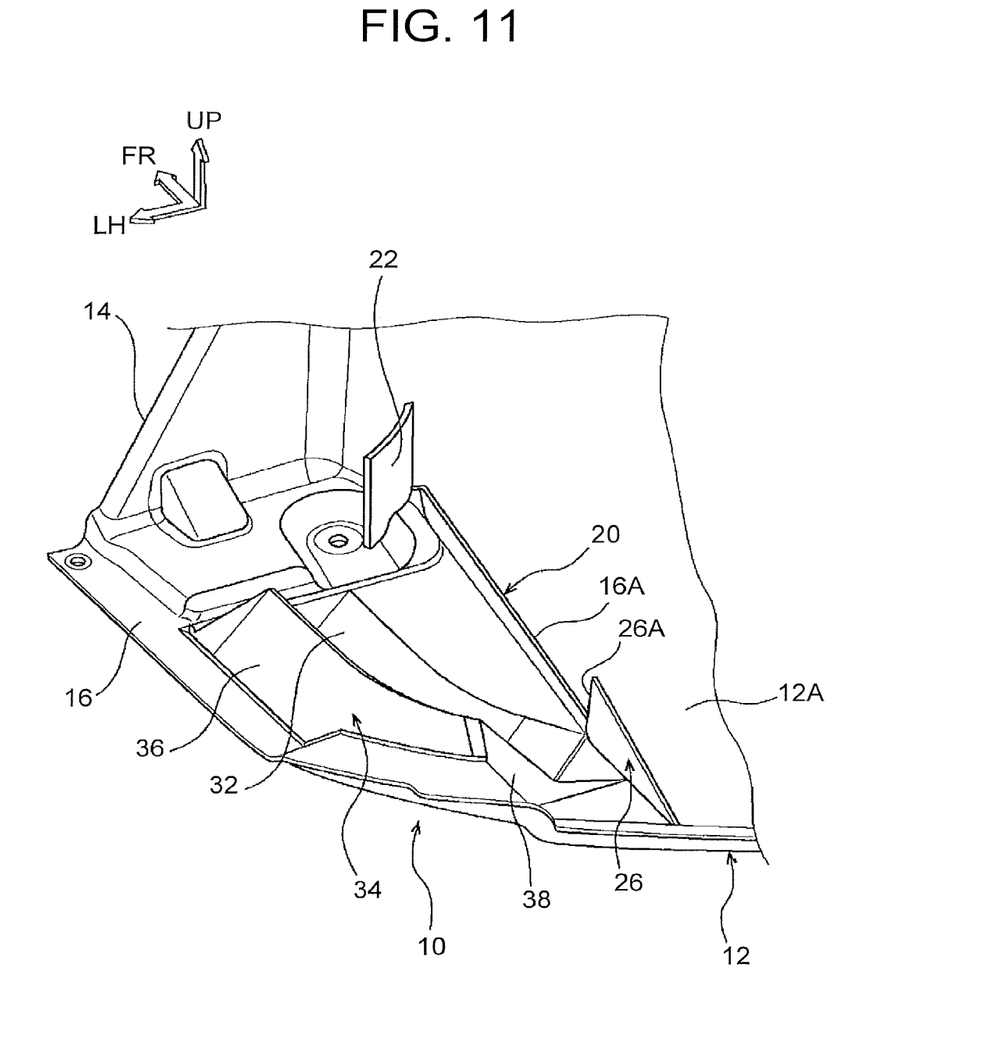
FIG. 11 is a perspective view illustrating a vehicle rear structure according to another modified example of the embodiment.

As illustrated in FIG. 11, when the vehicle 12 has no slant gutter 18 and the bottom cover 16 is disposed only at a position outward of a location, where the slant gutter 18 is provided in the foregoing embodiment, in the vehicle-width direction, the air inlet 20 is defined by an inner end portion 16A of the bottom cover 16, a front end portion 26A of a partition wall 26, and the front slant wall 22. The inner end portion 16A is an inner end portion of the bottom cover 16 in the vehicle-width direction. The inner end portion 16A of the bottom cover 16 is a boundary with a bottom portion 12A of the vehicle 12. The partition wall 26 is provided at a rear end of the inner end portion 16A of the bottom cover 16 in the vehicle-width direction. The partition wall 26 has a generally right triangular shape in a side view Thus, also in the vehicle 12 having such a configuration, the air taken into the air inlet 20 and flowing outward in the vehicle-width direction while the vehicle 12 is traveling is effectively guided by the slant wall 34 to flow downward and outward in the vehicle-width direction, and is then smoothly and efficiently discharged from the air outlet 30 with the inertial force of the airflow maintained. Note that the shape of the partition wall 26 is not limited to a generally right triangular shape in a side view as illustrated in FIG. 11, and may be, for example, a generally rectangular shape in a side view or a generally elliptical shape in a side view.

Figure 12:
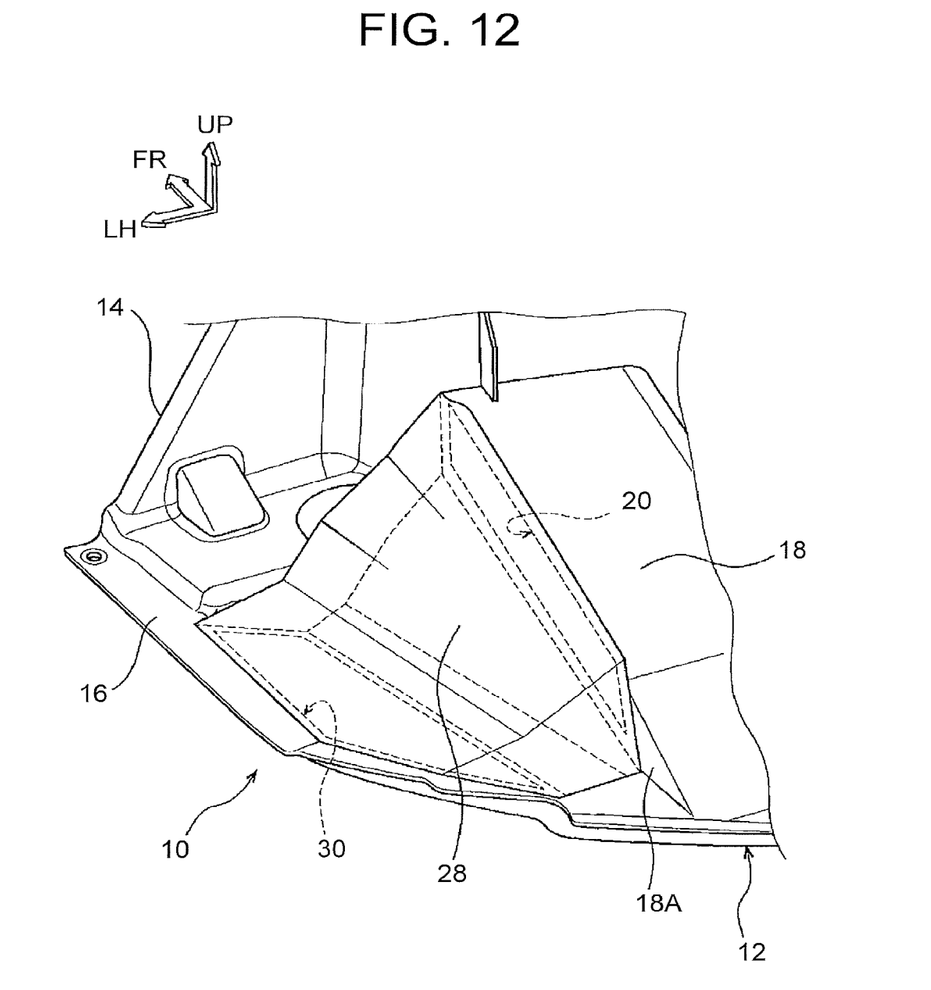
FIG. 12 is a perspective view illustrating a vehicle rear structure according to still another modified example of the embodiment.

As illustrated in FIG. 12, the bottom cover 16 may be provided with a duct 28. The duct 28 may be a tubular duct made of resin, which is configured such that the air taken into the air inlet 20 is discharged from the air outlet 30. In this case, the entirety of the air taken into the air inlet 20 while the vehicle 12 is traveling is smoothly and efficiently discharged from the air outlet 30 with the flow velocity thereof increased by the duct 28.

While the vehicle rear structure 10 according to each of the embodiments has been described with reference to the drawings, the vehicle rear structure 10 according to the disclosure is not limited to those illustrated in the drawings, and design changes may be made to the foregoing embodiments as appropriate within the scope of the disclosure. For example, the shape and size of the air inlet 20 and the shape and size of the air outlet 30 are not limited to those illustrated in the drawings.

Moreover, the shape and size of the slant wall 34 (the outer slant wall 36 and the rear slant wall 38) provided so as to stand from the outer-side edge and the rear-side edge of the air outlet 30 are not limited to those illustrated in the drawings. The slant wall 34 may have any shape and size that allow the air taken into the air inlet 20 and flowing outward in the vehicle-width direction to be effectively discharged from the air outlet 30 downward and outward in the vehicle-width direction.

Similarly, the shapes and sizes of the front slant wall 22 and the rear slant wall 24 provided at the front-side edge and the rear-side edge of the air inlet 20 are not limited to those illustrated in the drawings. The front slant wall 22 may have any shape and size that allow the air flowing through the slant gutter 18 to be effectively taken into the air inlet 20. The rear slant wall 24 may have any shape and size that allow the air flowing through the slant gutter 18 to be effectively taken into the air inlet 20 and that does not allow, for example, muddy water to be easily taken onto the upper surface of the bottom cover 16.

What is claimed is:

1. A vehicle rear structure comprising a bottom cover disposed rearward of a rear wheel well in a vehicle front-rear direction,
    the bottom cover including an air inlet into which air that has flowed from a front side toward a rear side in the vehicle front-rear direction is taken such that the air flows outward in a vehicle-width direction, and
    the bottom cover including an air outlet provided at a position outward of the air inlet in the vehicle-width direction, the air outlet being an air outlet from which the air flowing from the air inlet outward in the vehicle-width direction is discharged outward in the vehicle-width direction and downward in a vehicle-height direction.

2. The vehicle rear structure according to claim 1, further comprising a discharge-side guide wall provided at a side edge of the air outlet, the discharge-side guide wall being configured to guide the air such that the air flows outward in the vehicle-width direction and downward in the vehicle-height direction.

3. The vehicle rear structure according to claim 2, wherein the discharge-side guide wall includes an outer slant wall extending from an outer-side edge of the air outlet inward in the vehicle-width direction and upward in the vehicle-height direction, the outer-side edge being on an outer side of the air outlet in the vehicle-width direction, and the outer-side edge extending in the vehicle front-rear direction.

4. The vehicle rear structure according to claim 2, wherein the discharge-side guide wall includes a rear slant wall extending from a rear-side edge of the air outlet forward in the vehicle front-rear direction and upward in the vehicle-height direction, the rear-side edge being on a rear side of the air outlet in the vehicle front-rear direction, and the rear-side edge extending in the vehicle-width direction.

5. The vehicle rear structure according to claim 1, further comprising an intake-side guide wall provided at a side edge of the air inlet, the intake-side guide wall being configured to guide the air such that the air flows outward in the vehicle-width direction.

6. The vehicle rear structure according to claim 1, wherein the bottom cover is provided with a duct configured such that air taken into the air inlet is discharged from the air outlet.

* * * * *